US012643778B2

(12) United States Patent
Yang et al.

(10) Patent No.: US 12,643,778 B2
(45) Date of Patent: *Jun. 2, 2026

(54) ATTACHMENTS FOR INDUSTRIAL MATERIAL HANDLING EQUIPMENT

(71) Applicant: Cascade Corporation, Fairview, OR (US)

(72) Inventors: Jian Yang, Gresham, OR (US); Jacob Ammon Adams, Gresham, OR (US); Glenn Steven Prentice, Milwaukie, OR (US)

(73) Assignee: Cascade Corporation, Fairview, OR (US)

( * ) Notice: Subject to any disclaimer, the term of this patent is extended or adjusted under 35 U.S.C. 154(b) by 614 days.

This patent is subject to a terminal disclaimer.

(21) Appl. No.: 17/843,125

(22) Filed: Jun. 17, 2022

(65) Prior Publication Data

US 2022/0315403 A1 Oct. 6, 2022

Related U.S. Application Data

(63) Continuation-in-part of application No. 17/144,968, filed on Jan. 8, 2021, now Pat. No. 11,365,104, which (Continued)

(51) Int. Cl.
*B66F 9/14* (2006.01)
*G01G 19/08* (2006.01)
*G01G 19/12* (2006.01)

(52) U.S. Cl.
CPC .............. *B66F 9/148* (2013.01); *B66F 9/142* (2013.01); *G01G 19/083* (2013.01); *G01G 19/12* (2013.01)

(58) Field of Classification Search
CPC ...................................................... B66F 9/148
See application file for complete search history.

(56) References Cited

U.S. PATENT DOCUMENTS 4,323,132 A 4/1982 Bradley
4,560,016 A 12/1985 Ibanez et al.
(Continued)

FOREIGN PATENT DOCUMENTS

CN 101090859 A 12/2007
CN 207276135 U 4/2018
(Continued)

OTHER PUBLICATIONS

United States Patent and Trademark Office; Office Action dated Dec. 24, 2020 for U.S. Appl. No. 16/737,664; 12 pages.
(Continued)

*Primary Examiner* — Mark C Hageman

(74) *Attorney, Agent, or Firm* — Chernoff, Vilhaier LLP

(57) ABSTRACT

Attachment assemblies for industrial material handling equipment are shown and disclosed. In some embodiments, the attachment assembly includes a carriage assembly having a carriage and a linear actuator fixedly attached to the carriage. The carriage is mountable to industrial material handling equipment. The attachment assembly additionally includes a frame assembly slidably connected to the carriage. The attachment assembly further includes a faceplate assembly fixedly attached to the frame assembly. The faceplate assembly is configured to receive one or more support members for supporting a load. The faceplate assembly includes one or more load cells configured to measure horizontal and vertical forces applied to the one or more support members. The linear actuator slides the frame assembly laterally relative to the carriage assembly.

16 Claims, 18 Drawing Sheets

Related U.S. Application Data is a continuation-in-part of application No. 16/737, 664, filed on Jan. 8, 2020, now Pat. No. 11,130,660.

(56) References Cited

U.S. PATENT DOCUMENTS

| | | | |
|---|---|---|---|
| 5,147,171 | A | 9/1992 | Murray et al. |
| 5,635,680 | A | 6/1997 | Dojan |
| 5,707,201 | A | 1/1998 | Hamlik |
| 5,807,060 | A | 9/1998 | Hamlik |
| 5,837,946 | A | 11/1998 | Johnson et al. |
| 5,913,654 | A | 6/1999 | Kaup |
| 6,002,090 | A | 12/1999 | Johnson |
| 6,037,550 | A | 3/2000 | Bradley |
| 6,279,686 | B1 | 8/2001 | Kaup |
| 6,390,763 | B1 | 5/2002 | Prentice |
| 6,672,823 | B2 | 1/2004 | Henning |
| 7,008,167 | B2 | 3/2006 | Henning |
| 7,454,972 | B2 | 11/2008 | Heyman et al. |
| 7,909,563 | B2 | 3/2011 | Prenctice |
| 7,992,686 | B2 | 8/2011 | McCabe |
| 8,716,609 | B2 | 5/2014 | Pangrazio et al. |
| 9,073,738 | B2 | 7/2015 | Johnson |
| 9,187,303 | B2 | 11/2015 | Pangrazio et al. |
| 9,464,930 | B2 | 10/2016 | Santi |
| 9,562,804 | B2 | 2/2017 | Santi |
| 9,663,337 | B2 | 5/2017 | Kuck et al. |
| 10,048,110 | B2 | 8/2018 | Demozzi et al. |
| 10,087,060 | B2 | 10/2018 | Hamlik |
| 10,640,349 | B2 | 5/2020 | Prentice |
| 11,130,660 | B2 | 9/2021 | Prentice et al. |
| 11,365,104 | B2 | 6/2022 | Walthers et al. |
| 2003/0156935 | A1 | 8/2003 | Mondani et al. |
| 2006/0115349 | A1 | 6/2006 | Prentice |
| 2007/0079558 | A1 | 4/2007 | Foroni |
| 2008/0152471 | A1 | 6/2008 | Polvilampi |
| 2012/0273306 | A1 | 11/2012 | Pangrazio et al. |
| 2015/0093216 | A1 | 4/2015 | Pangrazio et al. |
| 2015/0233755 | A1 | 8/2015 | Pangrazio |
| 2018/0354761 | A1 | 12/2018 | Addicott |
| 2019/0241417 | A1 | 8/2019 | Prentice et al. |
| 2020/0256384 | A1 | 8/2020 | Campbell et al. |
| 2021/0206608 | A1 | 7/2021 | Prentice et al. |
| 2021/0206609 | A1 | 7/2021 | Walthers et al. |

FOREIGN PATENT DOCUMENTS

| | | |
|---|---|---|
| EP | 0489486 A1 | 6/1992 |
| GB | 2099787 A | 12/1982 |
| WO | 2016033451 A1 | 3/2016 |
| WO | 2021142310 A1 | 7/2021 |
| WO | 2023244928 A1 | 12/2023 |

OTHER PUBLICATIONS

United States Patent and Trademark Office; International Search Report and Written Opinion dated Mar. 26, 2021 for Int'l. App. No. PCT/US2021/012761; 14 pages.

United States Patent and Trademark Office; Office Action dated Oct. 4, 2021 for U.S. Appl. No. 17/144,968; 19 pages.

United States Patent and Trademark Office; International Search Report and Written Opinion dated Dec. 4, 2023 for Int'l. App. No. PCT/US2023/068060; 9 pages.

Chinense Patent Office; First Office Action dated Nov. 1, 2023 for CN App. No. 202180009986.7; 23 pages inclusive of English translation.

Requisition, prepared by the Canadian Patent Intellectual Property Office for application No. CA 3,170,974, filed Jun. 14, 2022, pp. 1-4.

First Examination Report prepared by the Australian Patent Office for Australian Patent Application No. 2021205347, dated Jan. 20, 2026, pp. 1-3.

ATTACHMENTS FOR INDUSTRIAL MATERIAL HANDLING EQUIPMENT

CROSS REFERENCE TO RELATED APPLICATIONS

This application is a continuation-in-part (CIP) application of U.S. patent application Ser. No. 17/144,968, filed on Jan. 8, 2021, and entitled ATTACHMENTS FOR INDUS-TRIAL MATERIAL HANDLING EQUIPMENT, which is a continuation-in-part (CIP) application of U.S. patent application Ser. No. 16/737,664, filed on Jan. 8, 2020, now U.S. Pat. No. 11,130,660, issued Sep. 28, 2021, and entitled LIFT TRUCK ATTACHMENTS. The complete disclosures of the above applications are hereby incorporated by reference for all purposes.

BACKGROUND

The subject matter of this application relates to attachments for industrial material handling equipment for load lifting, load shifting, and/or load weighing. Examples of industrial material handling equipment include lift trucks, automatic guided vehicles (AGVs), and other carriers and movers of various loads.

When used on a lift truck, the attachments are typically added to a standard carriage that carries the lifting forks to provide added range of motion and/or other functionalities. However, the attachments offset the position of the lifting forks an additional distance from the front axle of the lift truck, which reduces the lifting capacity of the lift truck. What is desired, therefore, is an attachment assembly that allows the nesting of components to provide the desired added range of motion and other functionalities while reducing the distance from the front axle of the industrial material handling equipment and increasing the capacity of the industrial material handling equipment.

BRIEF DESCRIPTION OF THE DRAWINGS

For a better understanding of the invention, and to show how the same may be carried into effect, reference will now be made, by way of example, to the accompanying drawings, in which.

DETAILED DESCRIPTION

Figure 1:
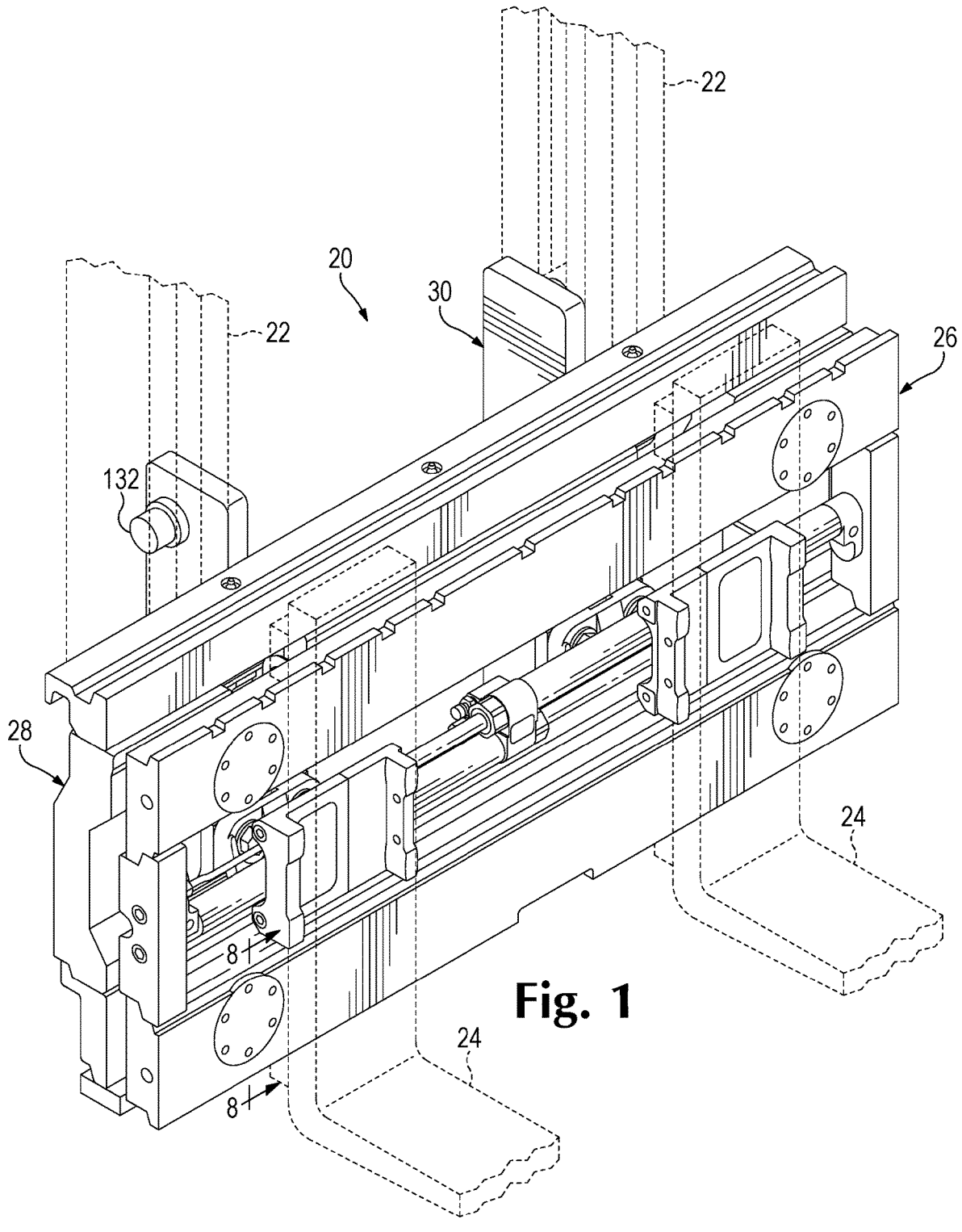
FIG. 1 is a perspective view of an illustrative example of an attachment assembly for industrial material handling equipment shown mounted to a lift truck and with lift forks mounted to a fork positioner of the attachment assembly.
Figure 2:
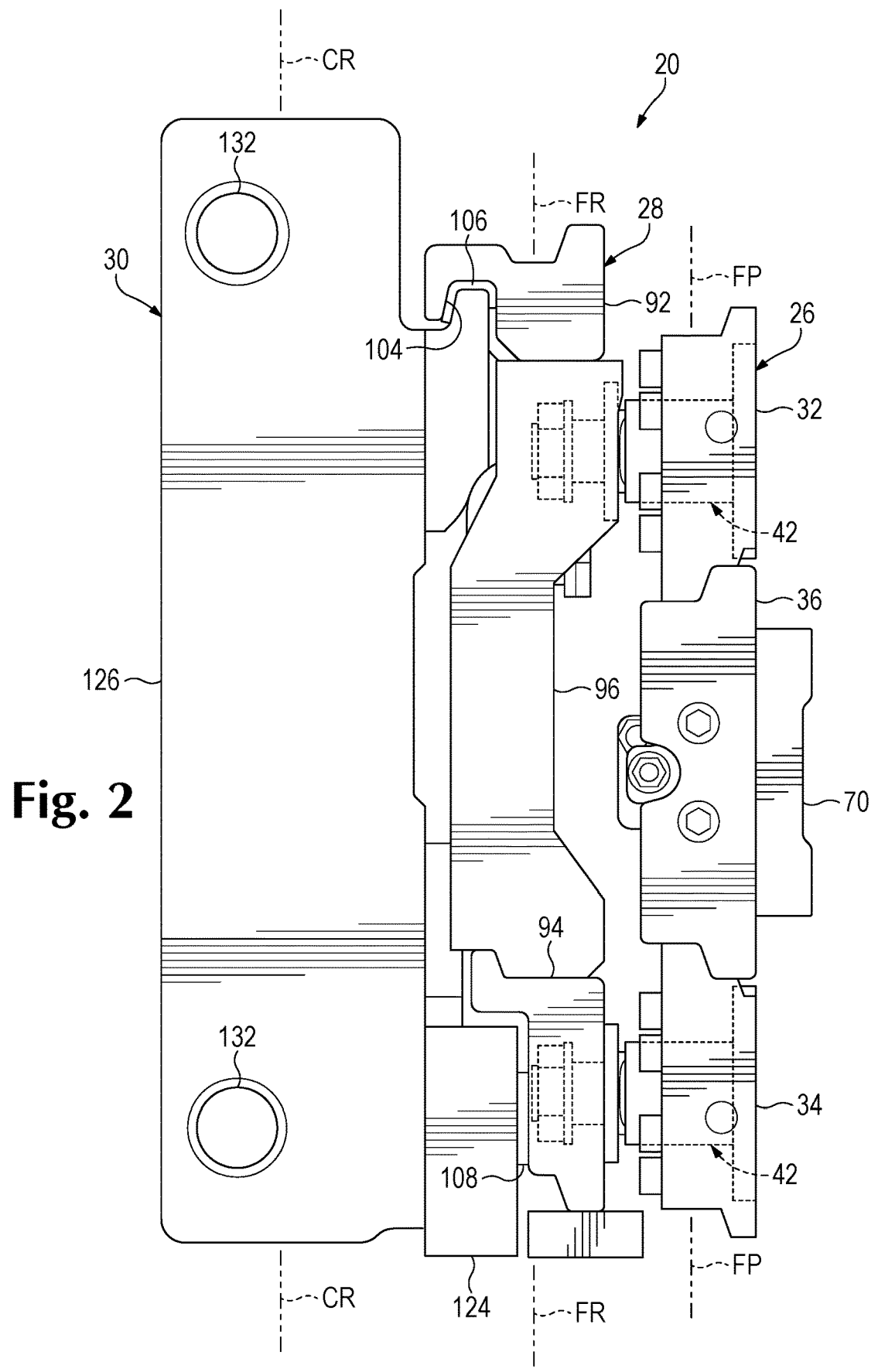
FIG. 2 is a side view of the attachment assembly of FIG. 1.

Referring to FIGS. 1-2, an illustrative example of an attachment assembly 20 for industrial material handling equipment is shown. In the example of FIGS. 1-2, the attachment assembly is shown attached to a lift truck. However, other embodiments of attachment assembly 20 may be configured to be attached to automatic guided vehicles (AGV) and other carriers and/or movers. The attachment assembly may be integrated with the industrial material handling equipment and/or may be removably mounted to that equipment.

In the example of FIGS. 1-2, attachment assembly 20 is shown received in mast channels 22 of a lift truck and supporting lift forks 24. Attachment assembly 20 includes a faceplate assembly 26, a frame assembly 28, and a carriage assembly 30. As shown in FIG. 2, at least a substantial portion of each of the faceplate, frame, and carriage assemblies are within separate faceplate FP, frame FR, and carriage CR planes, respectively, which are spaced and parallel to each other.

Figure 3:
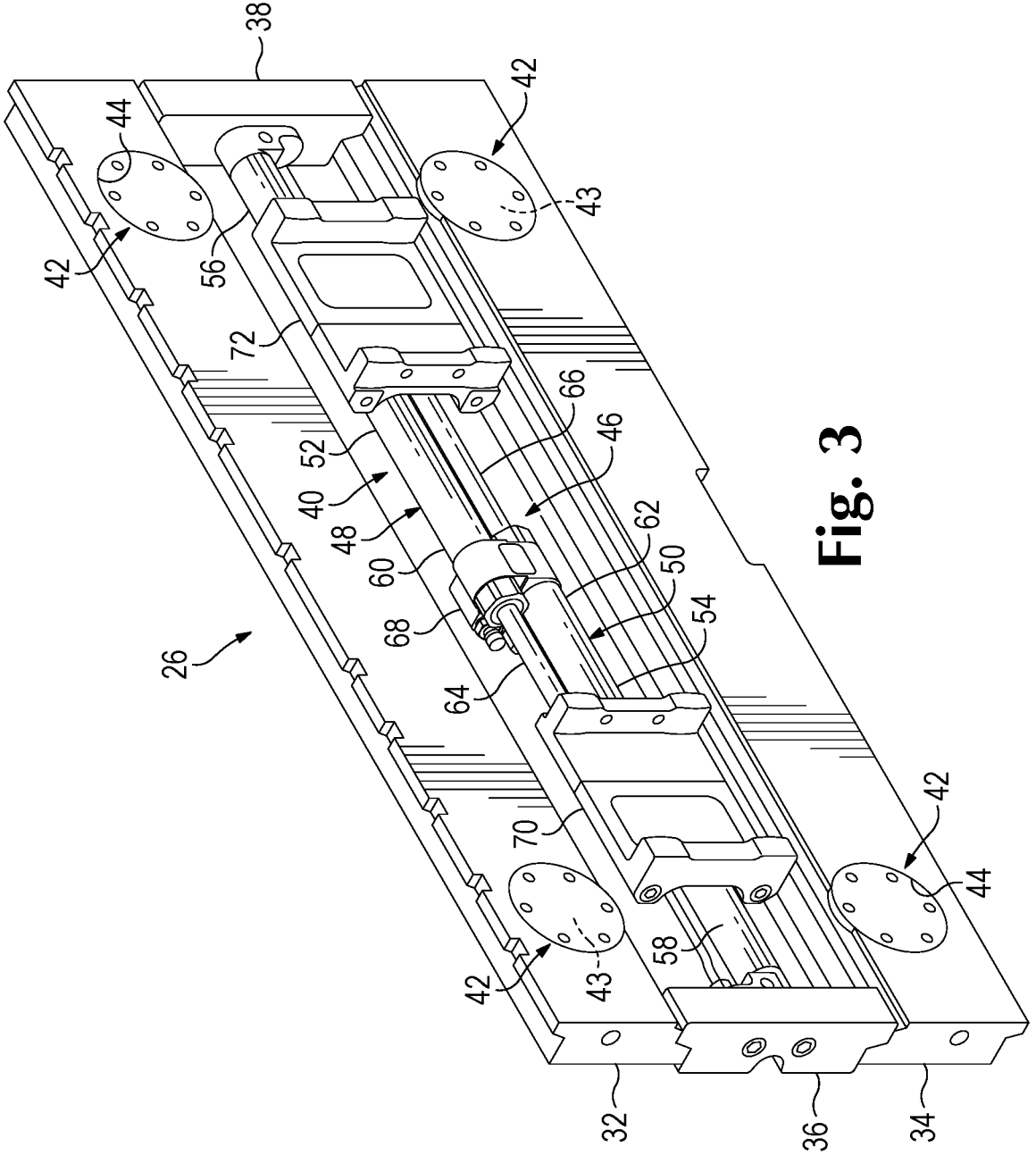
FIG. 3 is a front perspective view of a faceplate assembly of the attachment assembly of FIG. 1.
Figure 4:
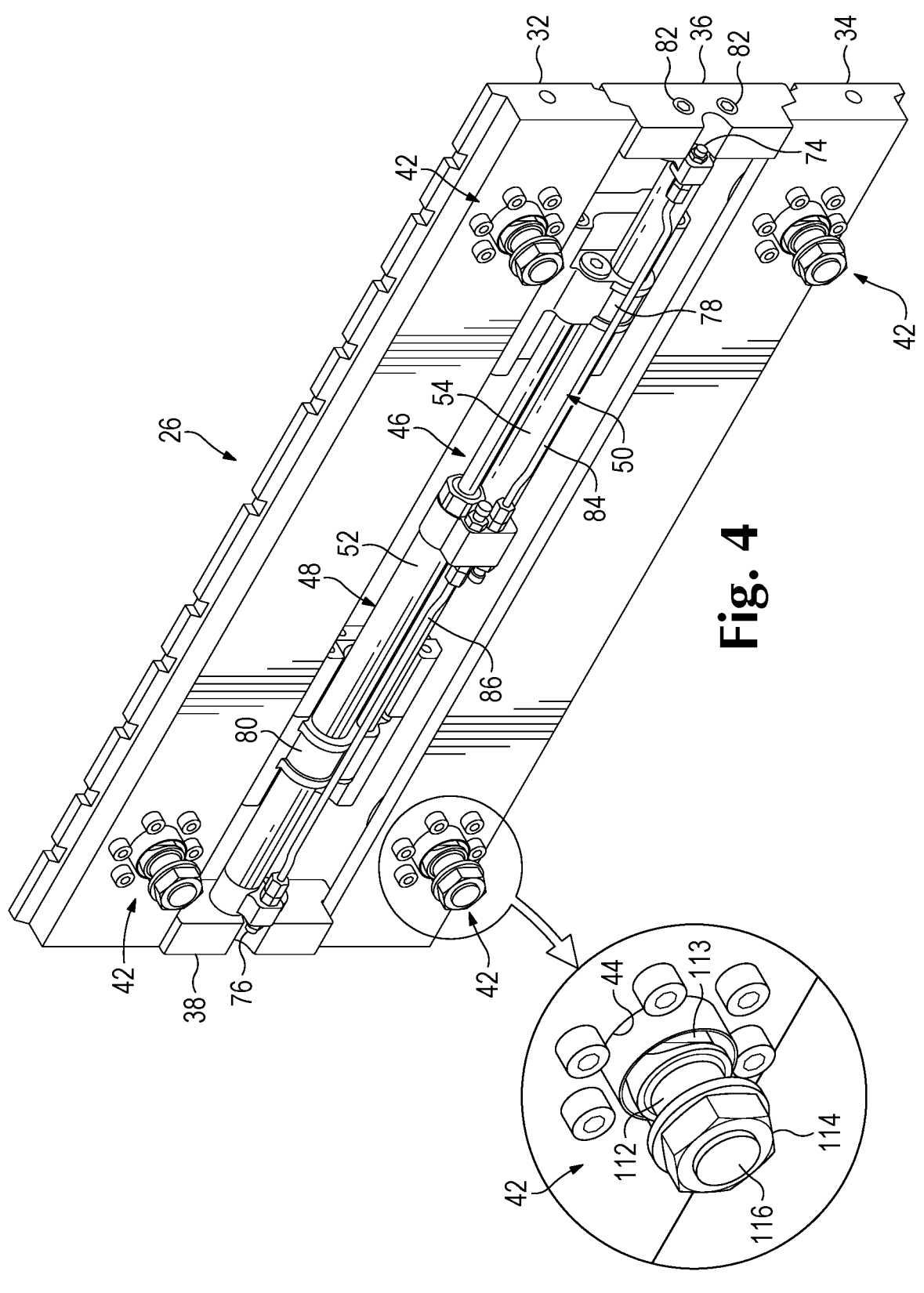
FIG. 4 is a rear perspective view of the faceplate assembly of the attachment assembly of FIG. 1.

Referring to FIGS. 3-4, faceplate assembly 26 includes an upper transverse faceplate member 32 and a lower transverse faceplate member 34, which are parallel, co-planar, and spaced from each other. End vertical faceplate members 36, 38 are disposed between the transverse faceplate members and connect the transverse faceplate members to define a faceplate central cavity 40 therebetween. The end vertical faceplate members are spaced and parallel to each other and are coplanar with the upper and lower transverse faceplate members. When weighing capability is desired, one or more load cell assemblies 42 are received in one or more faceplate holes 44. The load cell assemblies include one or more load cells 43 that measure the weight of a load supported by lift forks 24 or, when attached to other industrial material handling equipment, by support members other than the lift forks. Measurements may be made in any suitable way, such as via measuring deflection of the faceplate assembly and/or frame assembly and converting that deflection into a weight measurement. In the example shown in FIGS. 3-4, the faceplate assembly includes four load cell assemblies 42 are shown. The faceplate assembly may, however, include more or less load cell assemblies. The faceplate assembly is designed to lift truck carriage dimensional standards or the dimensional standards of other industrial material handling equipment. When the faceplate assembly includes one or more load cell assemblies, the faceplate assembly may also be referred to as an "outer weighing faceplate."

In the example shown in FIGS. 3-4, faceplate assembly 26 includes a fork positioner 46 disposed within faceplate central cavity 40. The fork positioner includes a pair of elongate bidirectional hydraulic piston and cylinder assemblies 48 and 50 each having a respective cylinder 52, 54 with a respective base portion 56, 58 at one end and a respective rod end portion 60, 62 at the other end from which a respective piston rod 64, 66 is extensible. A cylinder connector 68 is configured to interconnect rod end portion 60 of one cylinder rigidly to rod end portion 62 the other cylinder so that the longitudinal axes of the piston rods are parallel to each other.

Figure 5:
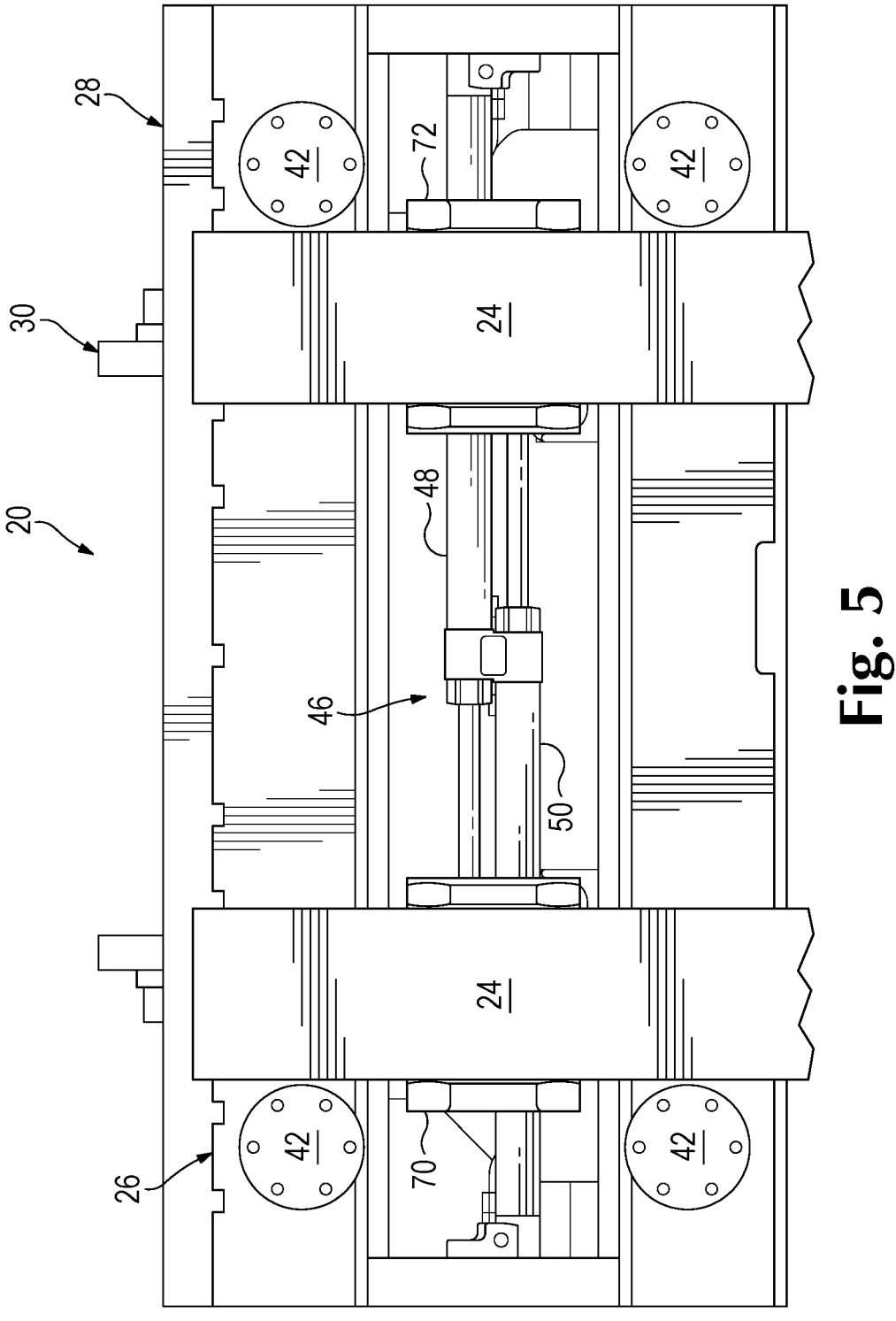
FIG. 5 is a front view of the attachment assembly of FIG. 1, shown with the lift forks moved apart.
Figure 6:
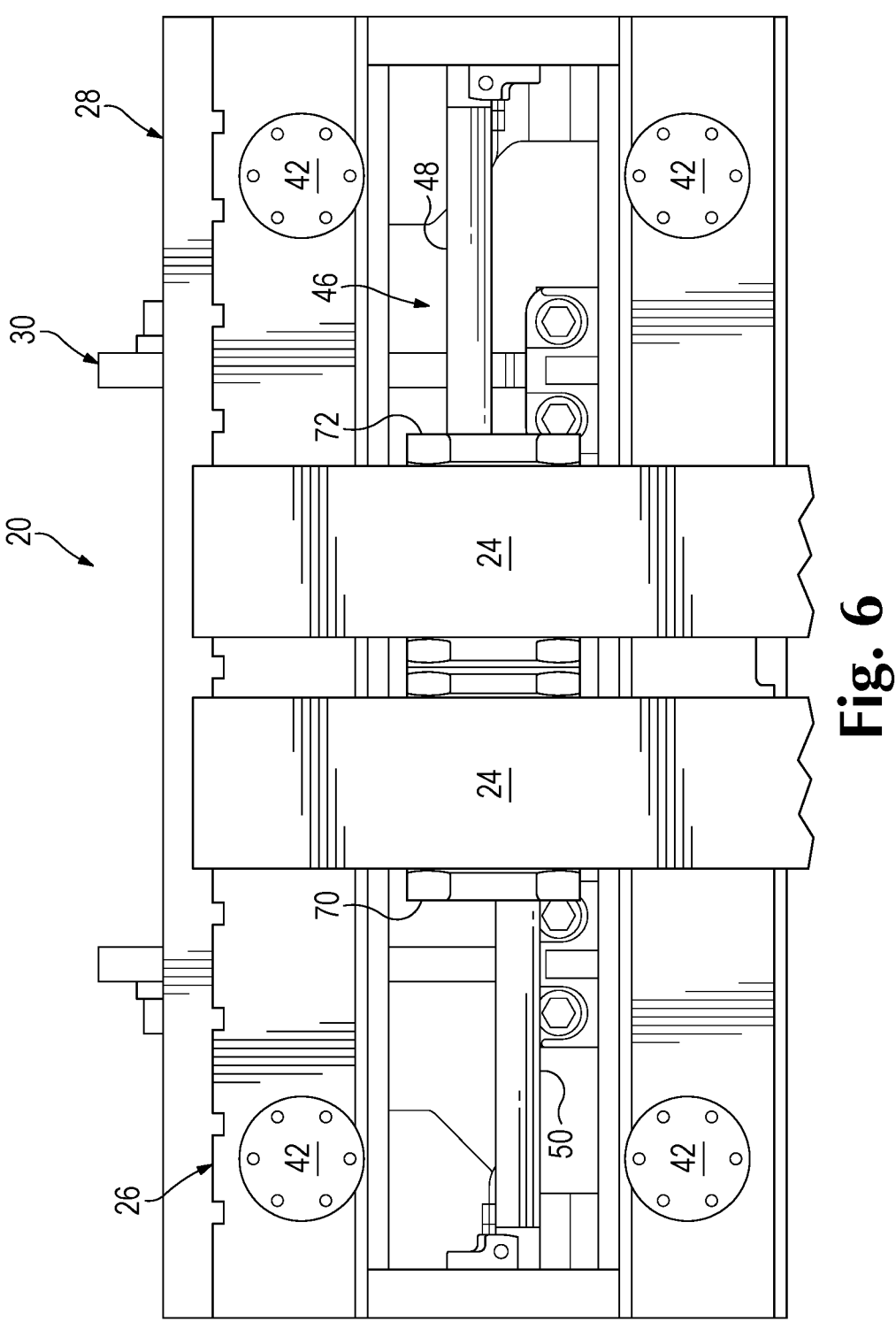
FIG. 6 is a front view of the attachment assembly of FIG. 1, shown with the lift forks moved together.

A pair of fork-positioning guide members 70, 72 each connects to a respective piston rod 64, 66 via a respective rod connector 74, 76, while also slidably and guidably engaging respective cylinder 52, 54 of the opposite piston and cylinder assembly by a respective slide bushing 78, 80. In the example shown in FIGS. 3-4, piston and cylinder assemblies 48 and 50 are mounted to end faceplate members 36 and 38 via fasteners 82. Cylinder connector 68 includes one or more hydraulic fluid line connectors 84, 86 communicating with the interior of respective cylinders 52, 54. Fork-positioning guide members 70, 72 receive the forks and are moved by piston rods 64, 66 to move those forks toward and away from each other, as shown in FIGS. 5-6. Although the fork-positioning guide members are shown to receive forks, those guide members may receive and move other attachments.

An example of fork positioner 46 is further described in U.S. Pat. No. 7,909,563, the complete disclosure of which is hereby incorporated by reference for all purposes. The nesting of the fork positioner within the faceplate central cavity reduces the thickness (i.e., measured in fore-aft direction) of lift truck attachment assembly 20, as best seen in FIG. 2. Although faceplate assembly 26 is shown to include fork positioner 46, other examples of the faceplate assembly may exclude the fork positioner. In those examples, the forks or other support members may be attached to the faceplate assembly by other means, such as via notches on the upper transverse faceplate member. In some examples, faceplate assembly 26 may not include any device(s) or structure(s) within the faceplate central cavity.

Figure 7:
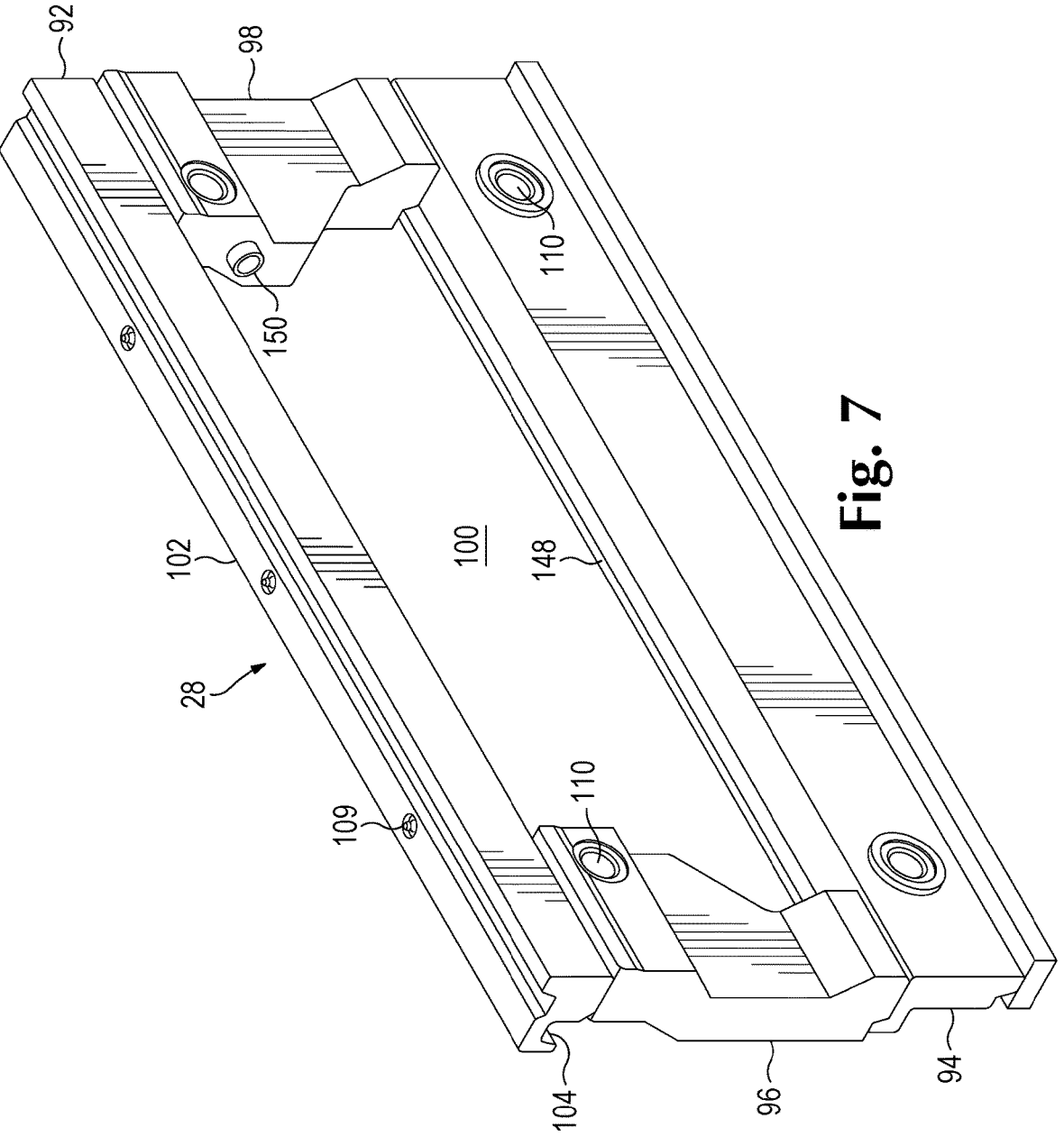
FIG. 7 is a perspective view of a frame assembly of the attachment assembly of FIG. 1.

Referring to FIG. 7, frame assembly 28 includes an upper transverse frame member 92 and a lower transverse frame member 94, which are parallel, coplanar, and spaced from each other. End vertical frame members 96, 98 are disposed between the transverse frame members and connect the transverse frame members to define a frame central cavity 100 therebetween. The end vertical frame members are spaced and parallel to each other and are coplanar with the upper and lower transverse frame members. Additionally, the end vertical frame members have thicknesses that are greater than the thicknesses of the upper and lower transverse frame members (as best seen in FIG. 2) to provide a mounting point for the loads cell assemblies (when included) and to reduce deflections of the faceplate assembly.

Upper transverse frame member 92 includes a downward hook portion 102 that extends across substantially or the entire length of that frame member and extends toward the carriage assembly when slidably received by the carriage assembly. The downward hook portion includes a groove 104 that receives sliding supports of the upper transverse carriage member of the carriage assembly, as further discussed below. In the example shown in FIG. 2, upper slide bearings 106 are disposed within groove 104. Additionally, lower slide bearings 108 are attached to the rear surface of the lower transverse frame member (i.e., surface facing the lower transverse carriage member of the carriage assembly). The upper and lower slide bearings reduce friction to facilitate sliding movement of the frame and faceplate assemblies relative to the carriage assembly. In the example shown in FIG. 7, the upper transverse frame member includes grease fittings 109 that allow a user to inject grease adjacent to and along the upper slide bearings.

Figures 8, 9:
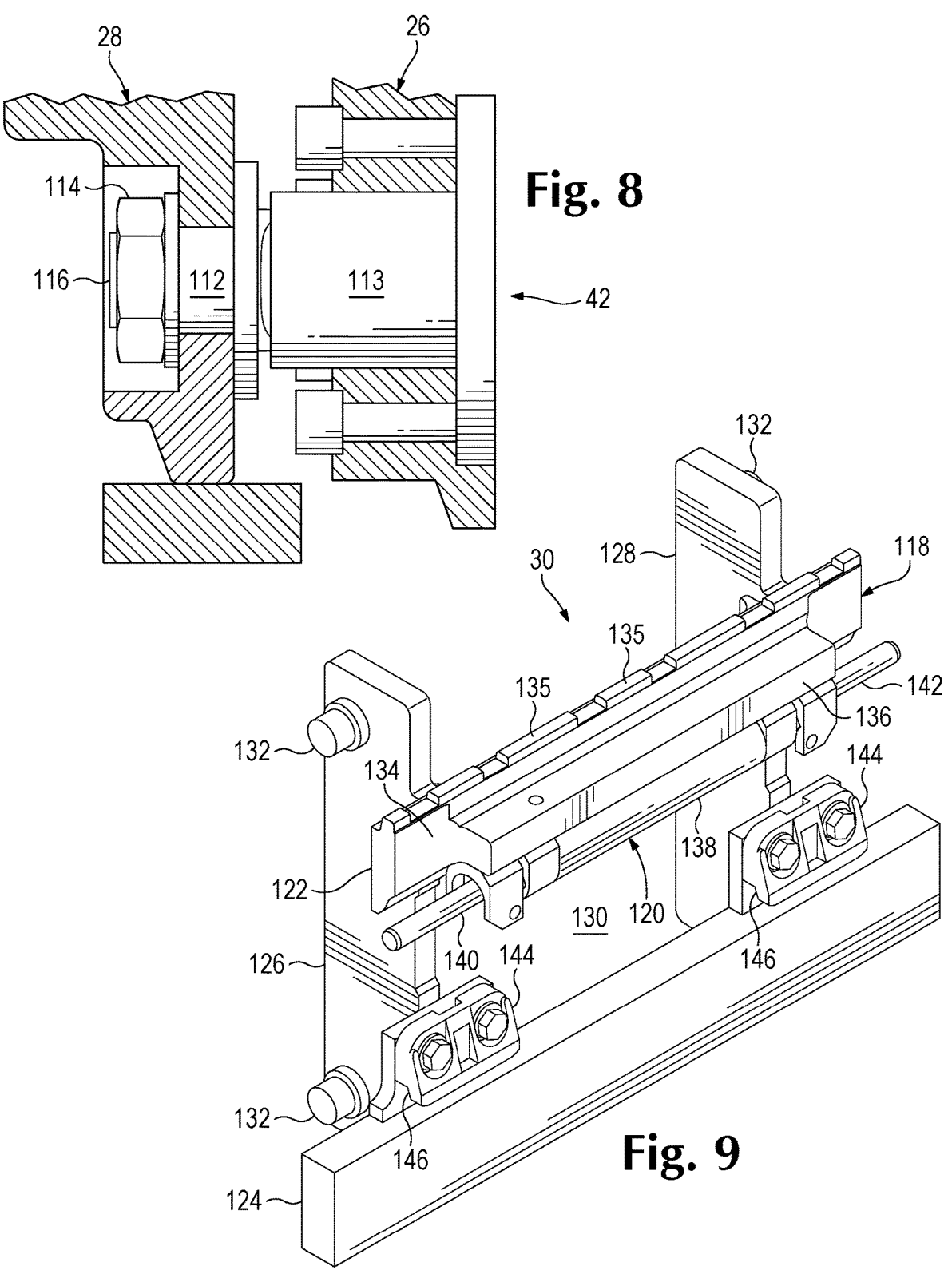
FIG. 8 is a partial sectional view of the attachment assembly of FIG. 1 along lines 8-8 in FIG. 1 showing a load cell assembly and a fastener to secure the faceplate assembly of FIGS. 3-4 to the frame assembly of FIG. 7.
FIG. 9 is a perspective view of a carriage assembly of the attachment assembly of FIG. 1.

End vertical frame members 96, 98 and lower transverse frame member 94 include one or more frame holes 110 that correspond with faceplate holes 44 of the faceplate assembly. When attachment assembly 20 includes one or more load cell assemblies 42, protruding portions 112 on housing 113 of those load cell assemblies may be received in the faceplate and frame hole(s) and secured or fixedly attached to the frame assembly and the faceplate assembly via fasteners 114, which also secures the faceplate assembly to the frame assembly. The protruding portions of the load cell assemblies include threaded portions 116 that receive fasteners 114 in the form of nuts, as shown in FIGS. 2, 4, and 8. In some examples, the faceplate assembly is secured to the frame assembly via only the load cell assemblies and the fasteners. In other words, the rest of the faceplate assembly may be supported by the load cell assemblies. The frame assembly thus allows lateral movement relative to the carriage assembly and serves as anchor points for the weighing load sensing components.

Referring to FIG. 9, carriage assembly 30 includes a carriage 118 and a lateral or linear actuator 120 attached to the carriage. In the example shown in FIG. 9, the carriage includes an upper transverse carriage member 122 and a lower transverse carriage member 124, which are spaced and parallel to each other. End vertical carriage members 126, 128 are attached to rear surfaces of the transverse carriage members and connect the transverse carriage members to define a carriage central cavity 130 therebetween. The end vertical carriage members are spaced and parallel to each other. Additionally, the end vertical carriage members include posts 132 that are received in mast channels of a lift truck (as shown in FIG. 1). Upper transverse carriage member 122 includes a base portion 134 that is coplanar with the lower transverse carriage member, raised portions or upper lateral slide supports 135 that are received in groove 104 of the frame assembly, and an extended portion or ledge 136 that extends perpendicularly from the base portion toward the frame assembly. The upper transverse carriage member carries both fore/aft load and the vertical load thus allowing the central cavities in the various assemblies of attachment assembly 20 without any central support structure(s) to support the above load(s). Lower transverse carriage member 124 may sometimes be referred to as a "lower lateral slide support." Other examples of carriage 118 may include other combinations of transverse carriage members and end vertical carriage members. In one alternative example, carriage 118 may include only an upper transverse carriage member.

In the example shown in FIG. 9, linear actuator 120 is attached to an underside of ledge 136. The linear actuator is configured to move the frame assembly and the faceplate assembly sideways relative to the carriage assembly. The linear actuator includes a body or cylinder 138 and piston rods 140, 142 slidably received in the cylinder. The piston rods are longitudinally opposed or move along a common longitudinal axis. Carriage assembly 130 further includes brackets 144 attached to lower transverse carriage member 124. The brackets include a slot 146 to receive a lip 148 of the frame assembly. Carriage assembly 130 may sometimes be referred to as a "stationary frame."

Figure 10:
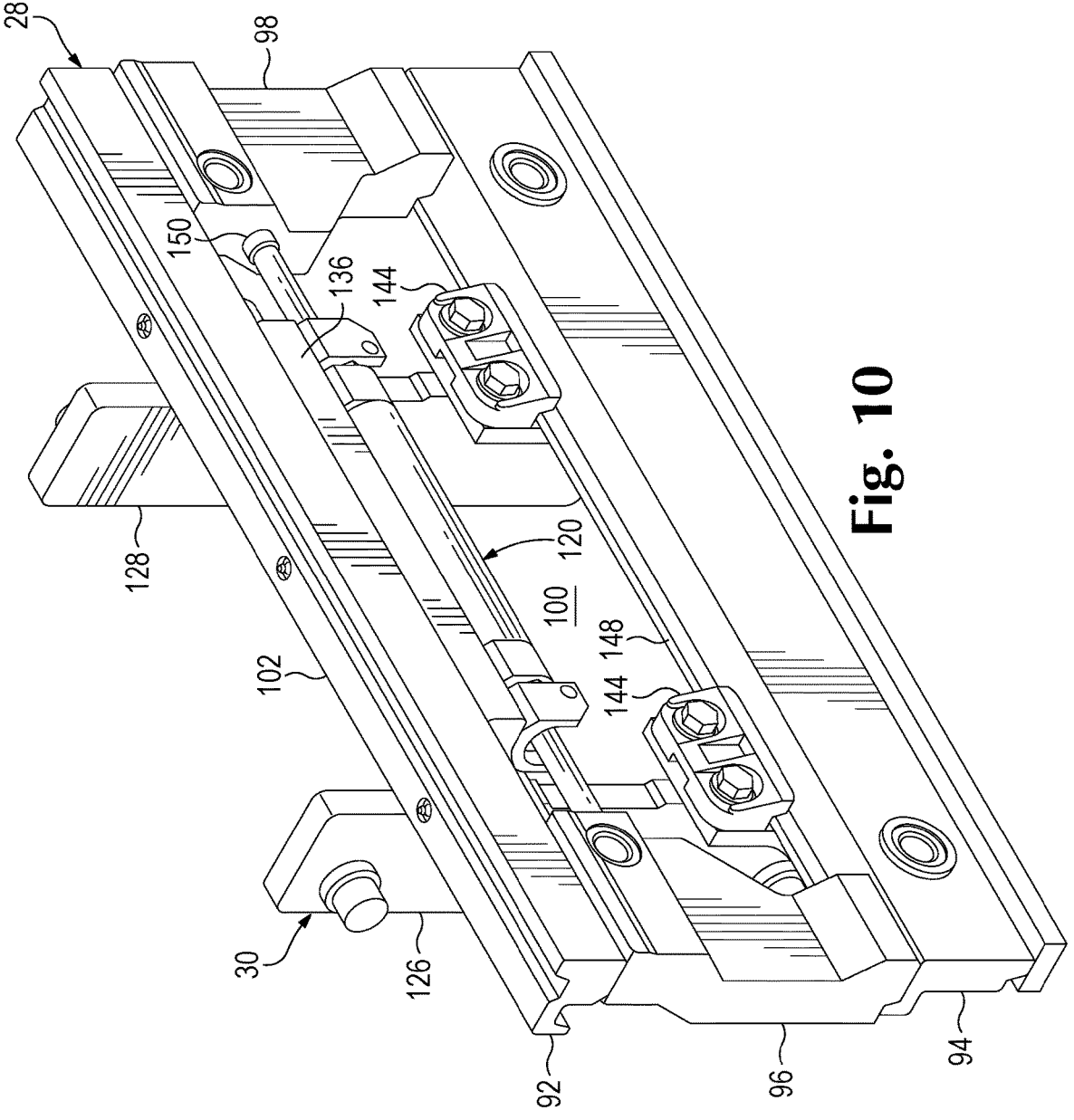
FIG. 10 is a perspective view of the attachment assembly of FIG. 1, shown without the faceplate assembly.
Figure 11:
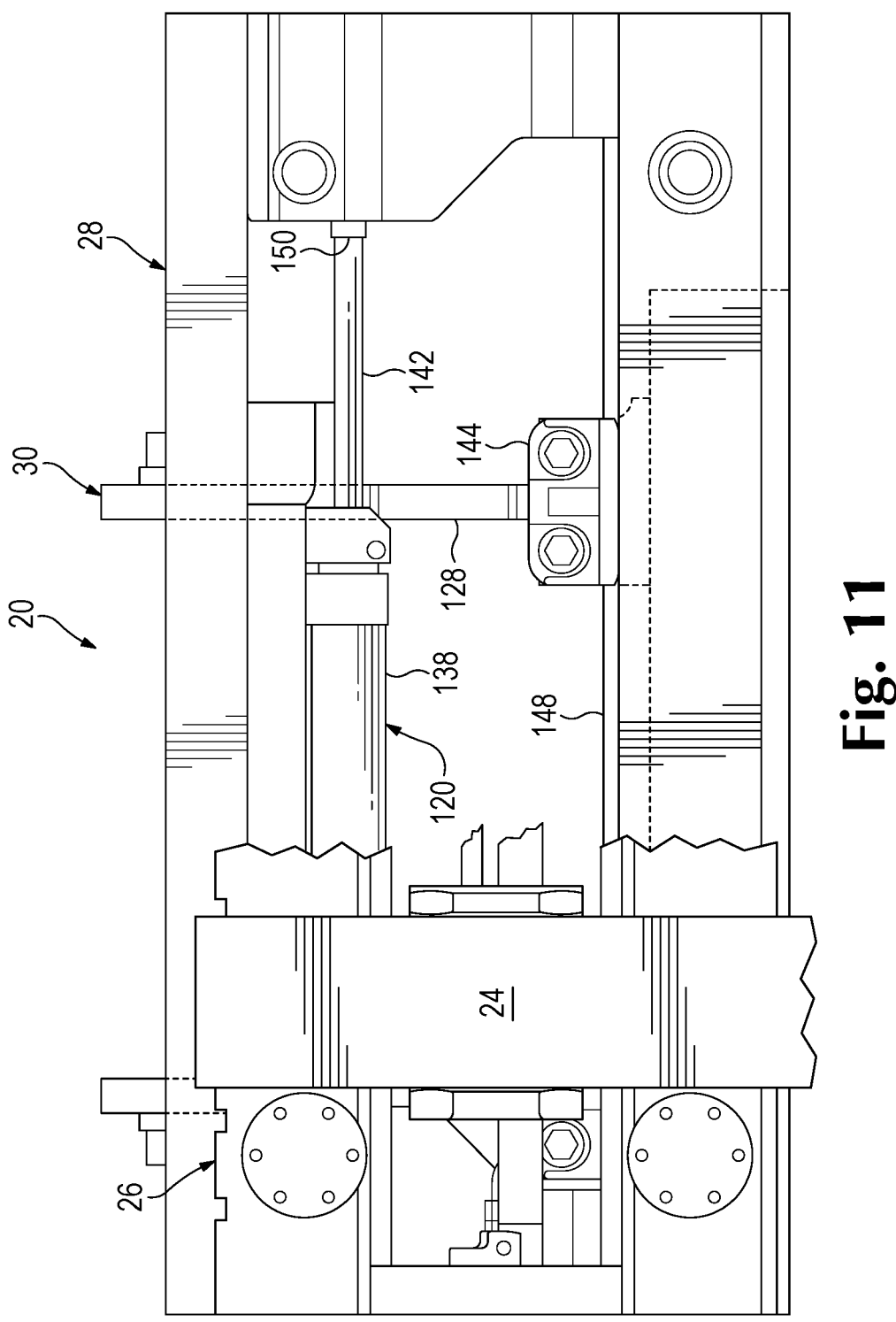
FIG. 11 is a front view of the attachment assembly of FIG. 1, shown with the frame assembly and faceplate assembly moved to one side and without some portions of the faceplate assembly to show movement of piston ends of a linear actuator of the carriage assembly.
Figure 12:
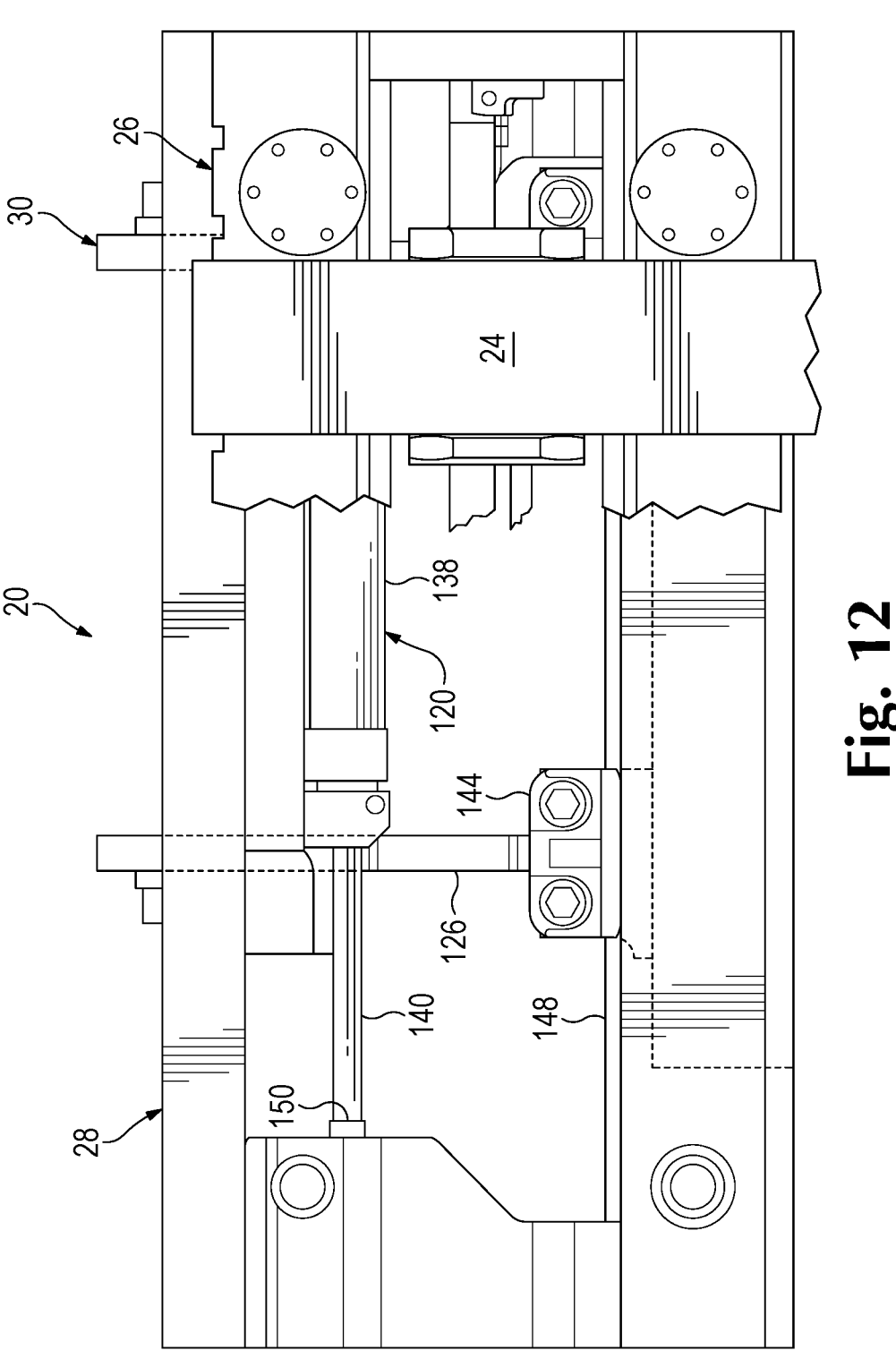
FIG. 12 is a front view of the attachment assembly of FIG. 1, shown with the frame assembly and faceplate assembly moved to the opposite side of FIG. 11 and without some portions of the faceplate assembly to show movement of piston ends of a linear actuator of the carriage assembly.
Figures 13, 14, 15, 16:
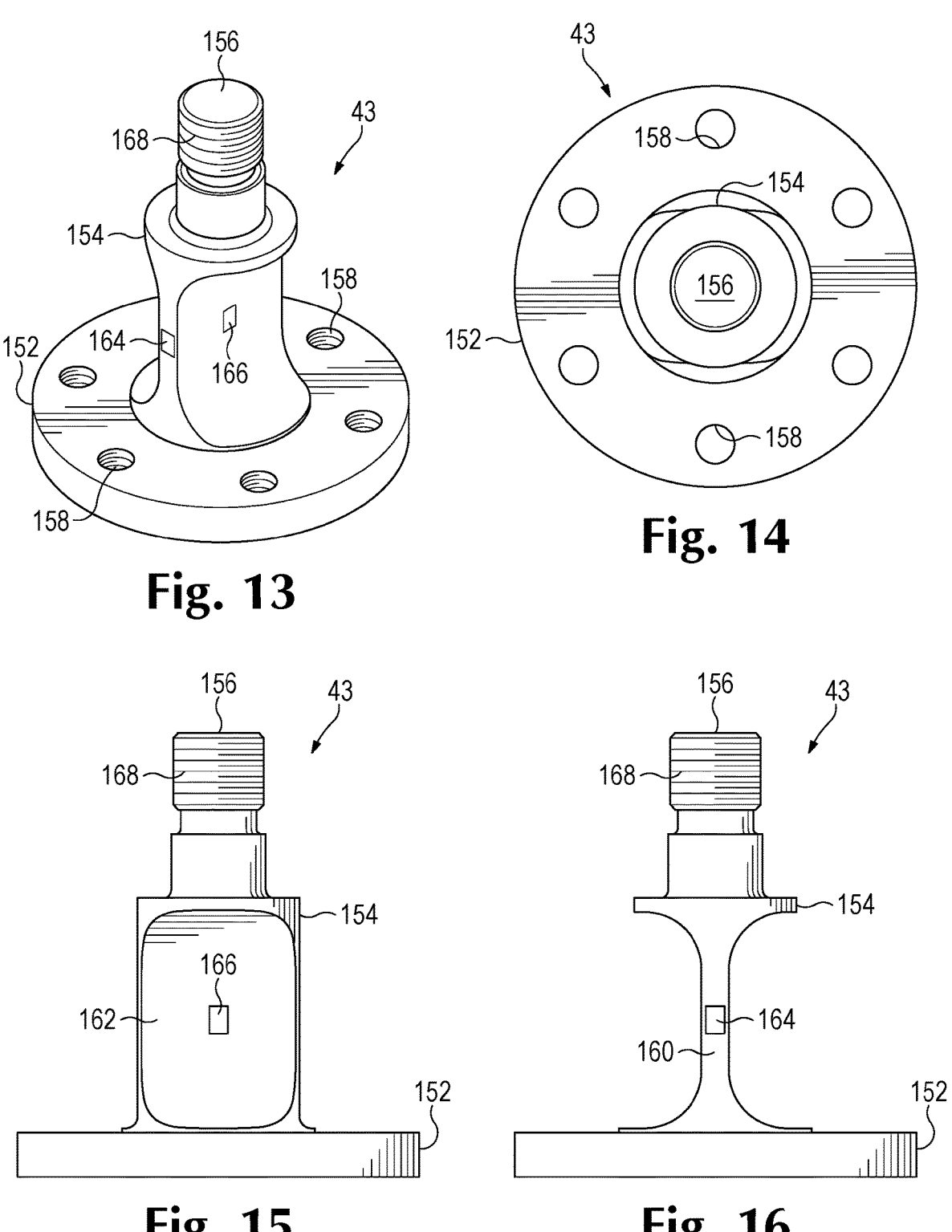
FIG. 13 is a perspective view of a load cell of the attachment assembly of FIG. 1.
FIG. 14 is a front view of the load cell of FIG. 13.
FIG. 15 is a side view of the load cell of FIG. 13.
FIG. 16 is a top view of the load cell of FIG. 13.

Referring to FIG. 10, the ledge of the upper transverse carriage member and/or the linear actuator are sized such that the linear actuator is received within frame central cavity 100 of the frame assembly. The nesting of the linear actuator within the plane of the frame assembly substantially reduces the thickness of attachment assembly 20. The ends of the piston rods of the linear actuator are received in reaction blocks or rod connectors 150 that are fixedly attached to end vertical faceplate members 96, 98 of the frame assembly. In other words, the piston rods of the linear actuator contact the end vertical faceplate members. Extension and retraction of the piston rods move the frame assembly and faceplate assembly laterally or sideways (or parallel to the common longitudinal axis of the piston rods) relative to the carriage assembly, as shown in FIGS. 11-12. Movement of the frame and faceplate assemblies by the linear actuator are within the planes of the frame and faceplate assemblies (i.e., faceplate FP and frame FR planes shown in FIG. 2).

Referring to FIGS. 13-16, an example of load cell 43 is shown. The load cell includes a base 152, a body 154, and a coupler 156. In the example shown in FIGS. 13-16, base 152 is disc-shaped or cylindrical and include a plurality of apertures 158 to receive connectors to attach the load cell to the faceplate assembly. Body 154 is elongate and includes opposed side portions 160 and opposed side portions 162. Side portions 162 are substantially wider than side portions 160, as shown in FIGS. 13-16. Strain gauges 164 are mounted on the outer surface of one or both narrow side portions 160. Additionally, strain gauges 166 are mounted on the outer surface of one or both wide side portions 162. Strain gauges 164 and 166 are thus mounted or positioned perpendicular (ninety degrees) or generally perpendicular to each other to allow those gauges to measure both vertical and horizontal forces during operation. Specifically, strain gauges 164 measure horizontal forces and strain gauges 166 measure vertical forces. Coupler 156 includes a threaded portion 168 to receive a nut to attach the faceplate assembly to the frame assembly, as described above.

The four spaced load cell assemblies 42 each having a load cell with strain gauges positioned to measure horizontal and vertical forces provide various information to the operator of the attachment. For example, the measured weight from the load cell assemblies may be used by a controller (such as the controller of the industrial material handling equipment) to calculate lateral offset of the center of gravity by comparing the difference of the weight measurements of the left-hand and right-hand load cells. When the lateral offset is above a predetermined amount or outside a predetermined window, the controller may shut off operation of the attachment or the industrial material handling equipment. Additionally, measurement of the horizontal forces can alert an operator of an unexpected horizontal force, such as contacting a trailer wall or another load when engaging a pallet. The controller may shut off operation of the attachment or the industrial material handling equipment if a horizontal force outside a predetermined window or above a predetermined amount is measured.

Figures 17, 18:
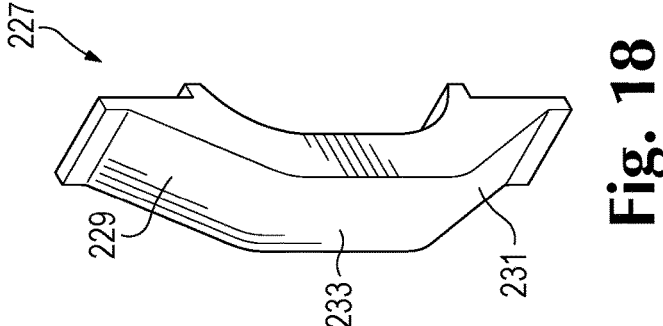
FIG. 17 is a rear perspective view of another example of a faceplate assembly of the attachment assembly of FIG. 1, showing a center tie bar.
FIG. 18 is a perspective view of the center tie bar of FIG. 17.
Figure 19:
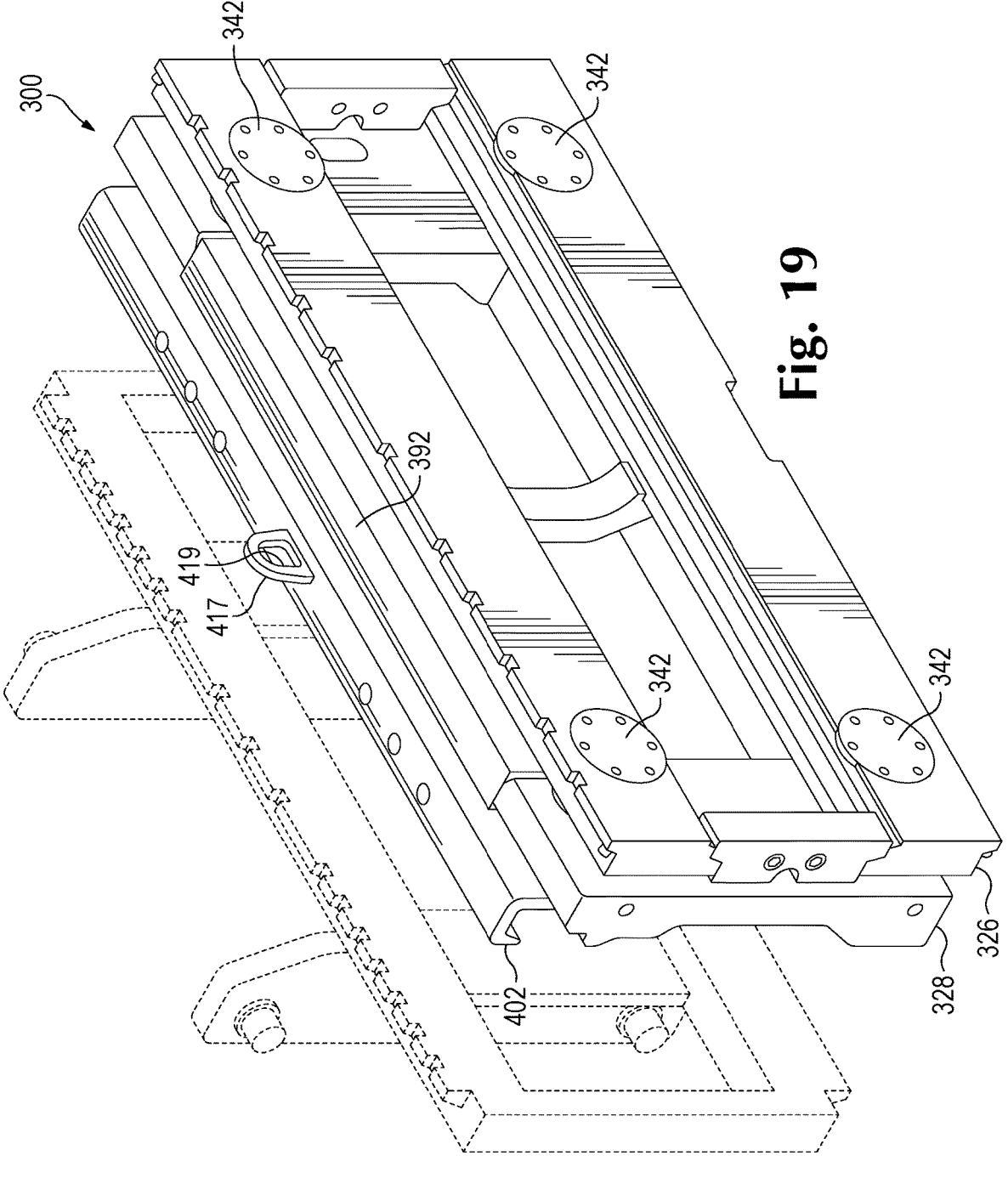
FIG. 19 is a front perspective view of another example of an attachment assembly.
Figure 20:
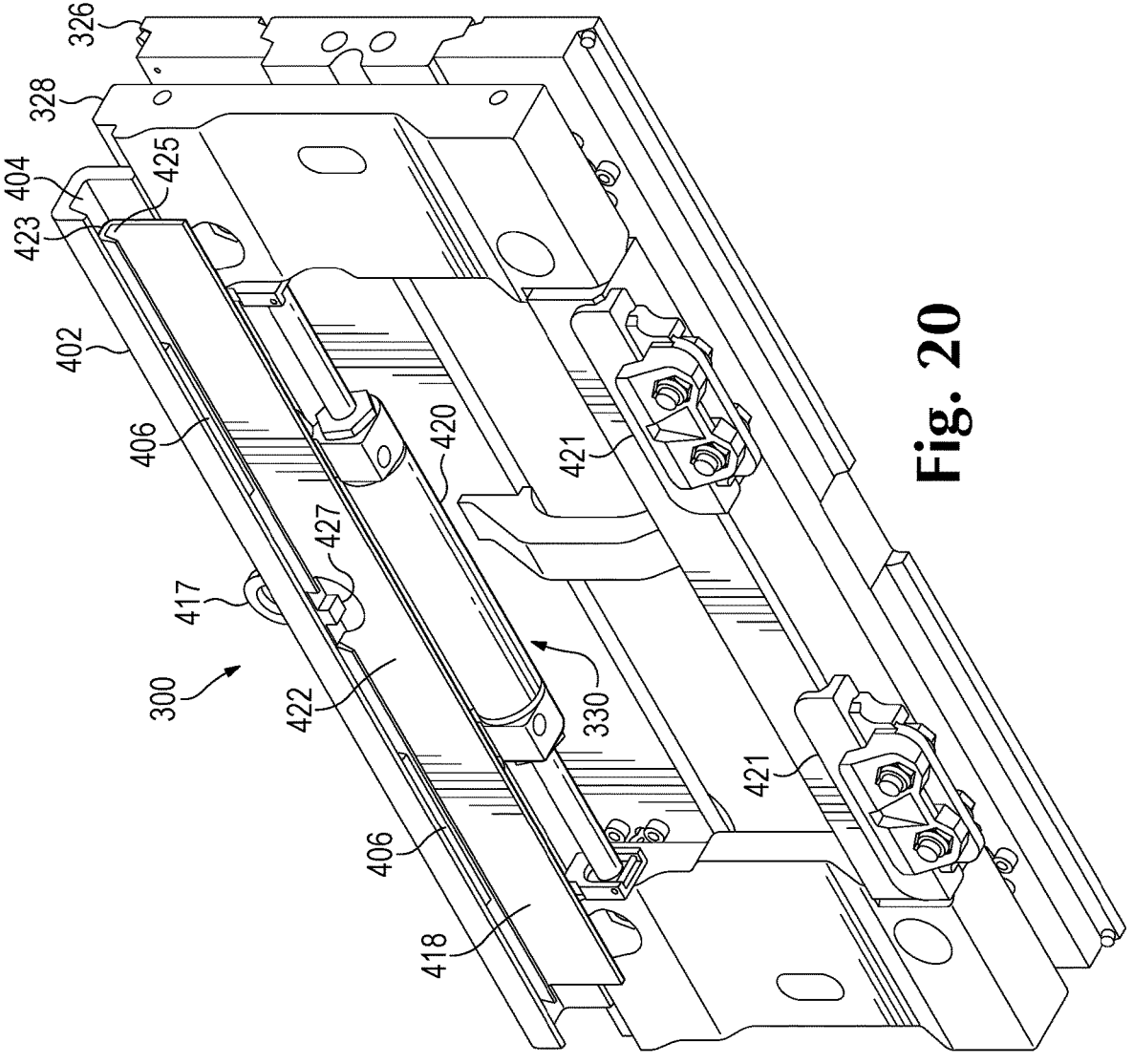
FIG. 20 is a rear perspective view of the attachment assembly of FIG. 19.
Figure 21:
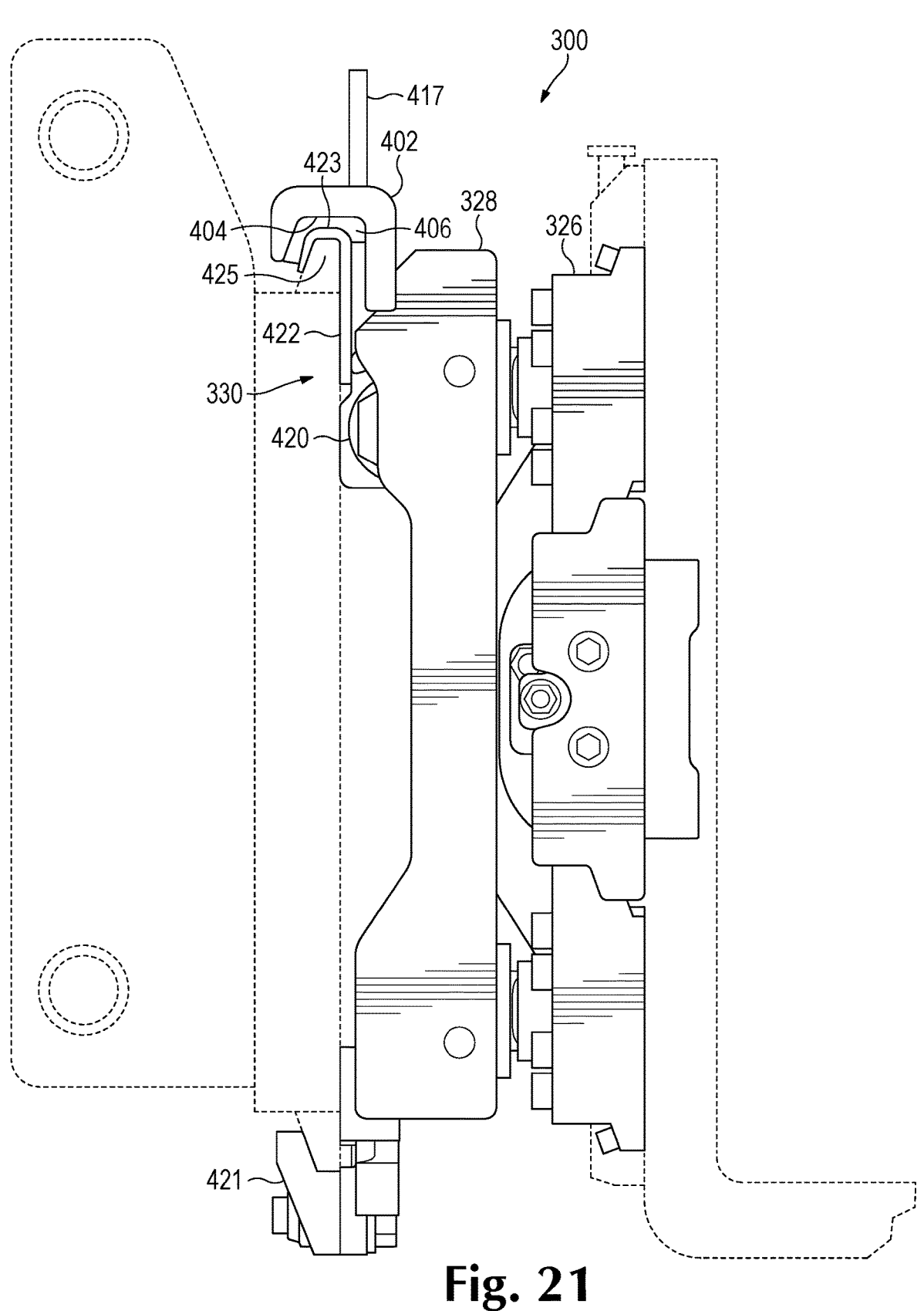
FIG. 21 is a side view of the attachment assembly of FIG. 19.

Referring to FIGS. 17-18, another example of a faceplate assembly 26 is shown and is generally indicated at 226. Unless explicitly excluded, faceplate assembly 226 may include one or more of the structures and components of faceplate assembly 26. Unlike faceplate assembly 26, faceplate assembly 226 includes a center tie element or center tie bar 227. The center tie bar includes first and second end portions 229 and 231 and a center portion 233 disposed therebetween. First and second end portions 229 and 231 are attached to upper transverse faceplate member 232 and lower transverse faceplate member 234, respectively, to span a faceplate central cavity 240 between those faceplate members. Center portion 223 is arched away from the upper and lower transverse faceplate members to accommodate components of fork positioner 46. The center tie bar is significant because it stiffens the faceplate assembly and reduces measurement error from the load cells of the load cell assemblies that are attached to the faceplate assembly. Attachment assembly 20 may also be referred to as an "integral assembly".

Referring to FIGS. 19-25, another example of attachment assembly 20 is shown and generally indicated at 300. Unless explicitly excluded, attachment assembly 320 may include one or more structures and components of attachment assembly 20 (and/or faceplate assembly 226). Similar to attachment assembly 20, attachment assembly 320 includes a faceplate assembly 326, a frame assembly 328, and a carriage assembly 330. Faceplate assembly 326 may be substantially similar or the same (or have substantially similar or identical components) as faceplate assembly 26 and/or 226. In the example shown in FIGS. 19-25, faceplate assembly 326 does not include a fork positioner. However, in other examples, faceplate assembly 326 may include a fork positioner, such as fork positioner 46 discussed above. In the example shown in FIGS. 19-25, faceplate assembly 326 is fixedly attached to frame assembly 328 so that, for example, faceplate assembly 326 moves or slides with frame assembly 328 relative to carriage assembly 330. Additionally, faceplate assembly 326 receives and/or supports one or more support members (e.g., lift forks) for supporting a load. Moreover, faceplate assembly 326 includes load cell assemblies 342 (which are substantially similar or the same as load cell assemblies 42) to measure horizontal and/or vertical forces applied to the one or more support members.

Frame assembly 328 may be substantially similar or the same (or have substantially similar or identical components) as frame assembly 28. For example, frame assembly 328 includes an upper transverse frame member 392 having a downward hook portion 402 substantially similar to upper transverse frame member 92 having downward hook portion 102. Downward hook portion 402 includes a groove 404 that receives sliding supports of the carriage member of the carriage assembly, as further discussed below. Additionally, upper slide bearings 406 are disposed within groove 104. Moreover, frame assembly 328 is movably or slidably connected to the carriage assembly. Unlike downward hook portion 102, downward hook portion 406 is offset or closer to the carriage assembly and includes a hanging tab member 417 with a hole 419. Additionally, unlike frame assembly 28, frame assembly 328 includes spaced bracket assemblies 421 that may engage and/or receive bottom portion(s) of the industrial material handling equipment (e.g., carriage of a forklift).

Figures 22, 23:
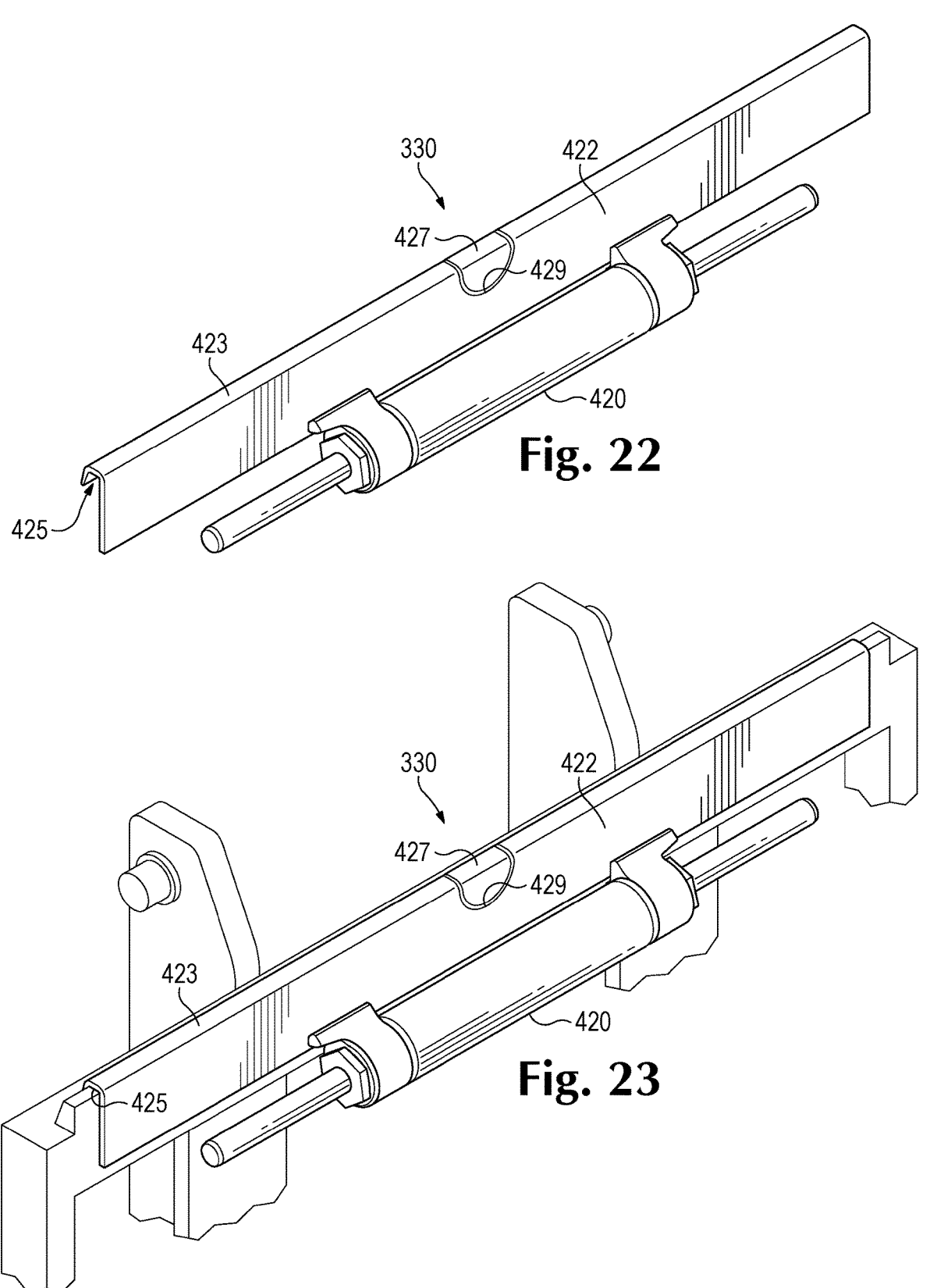
FIG. 22 is a front perspective view of an example of a carriage assembly of the attachment assembly of FIG. 19.
FIG. 23 is a front perspective view of the carriage assembly of FIG. 22 shown attached to an example of a carriage of industrial material handling equipment.
Figures 24, 25:
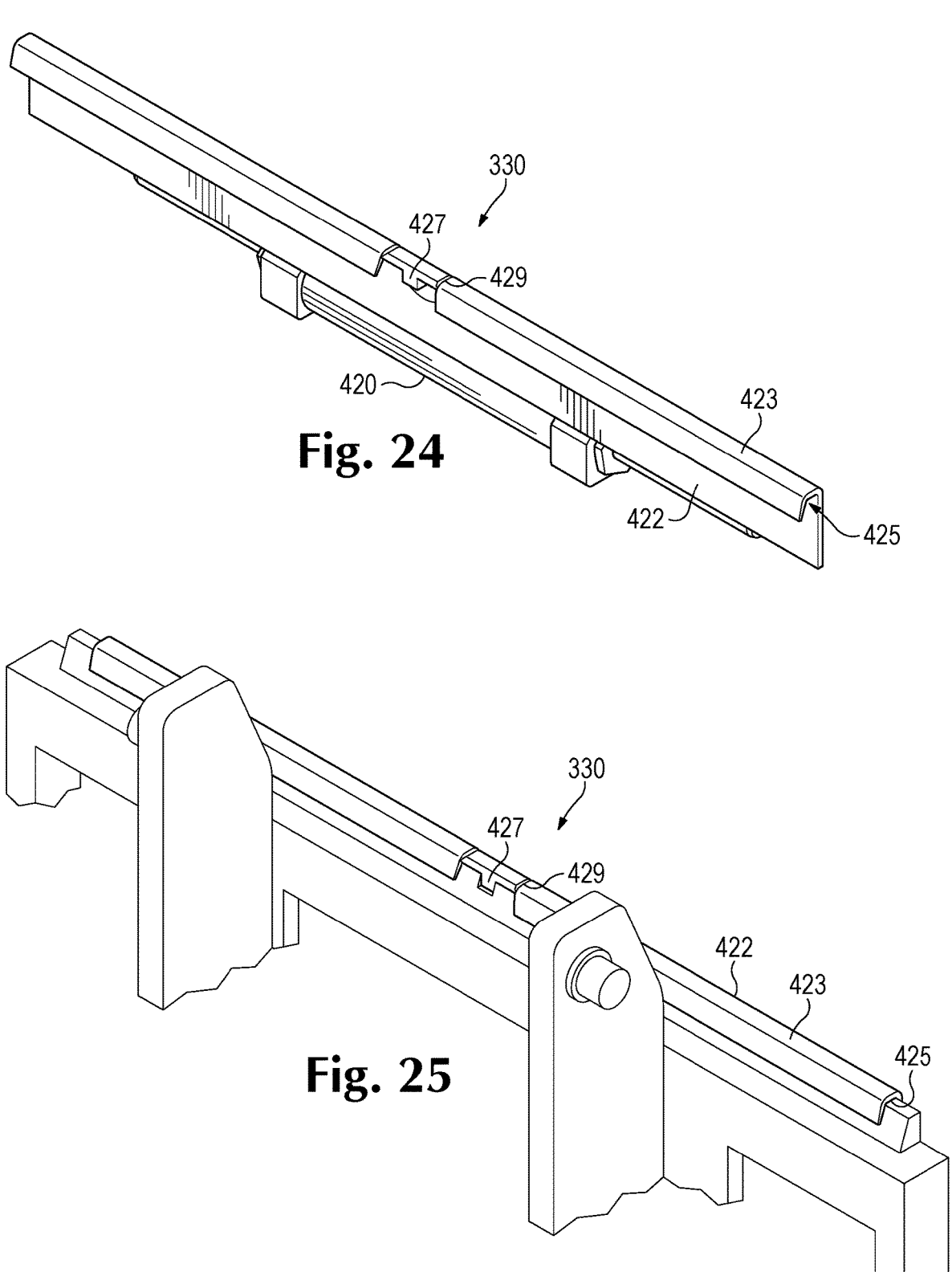
FIG. 24 is a rear perspective view of the carriage assembly of FIG. 22.
FIG. 25 is a rear perspective view of the carriage assembly of FIG. 22 shown attached to the carriage of FIG. 23.

Carriage assembly 330 includes a carriage 418 and a lateral or linear actuator 420 attached or fixedly attached to the carriage. The carriage includes a transverse member 422 and the linear actuator is attached or fixedly attached to the transverse member. Although the carriage is shown to include only transverse member 422, other examples of carriage 418 may include other transverse and/or end member(s). In the example shown in FIGS. 19-25, transverse member 422 is J-shaped (or upside-down J-shaped) having an upwardly protruding portion 423 that is received in groove 404 of frame assembly 328 to, for example, allow the frame assembly to slide laterally relative to the carriage assembly. Additionally, transverse member 422 includes a cavity 425 for receiving a portion of the industrial material handling equipment. For example, as best shown in FIGS. 23 and 25, the industrial material handling equipment may include a protruding portion or ledge that is received in cavity 425 such that attachment assembly 300 is supported on the industrial material handling equipment. When supported on the industrial material handling equipment, upwardly protruding portion 423 is disposed between downward hook portion 402 and the protruding portion of the industrial material handling equipment.

In the example shown in FIGS. 19-25, carriage 418 additionally includes at least one projection or tab member 427 that is sized to be received in at least one recess or notch of the industrial material handling equipment (e.g., carriage of a lift truck). The tab member is attached or fixedly attached to transverse member 422 via opening 429 of transverse member 422, which may allow selective attachment of various sized tab members for various industrial material handling equipment. The example shown in FIGS. 19-25 includes a single tab member but other examples of carriage 418 may include two or more tab members 427, which may have the same or different sizes. Alternatively, tab member(s) 427 may be formed with transverse member 422. Linear actuator 420 moves or slides frame assembly 328 laterally or sideways relative to carriage assembly 330. In the example shown in FIGS. 19-25, linear actuator includes a body or cylinder 438 and piston rods 440, 442 slidably received in the cylinder. The piston rods are longitudinally opposed or move along a common longitudinal axis. Because attachment assembly 300 can be supported on and/or attached to, for example, a standard carriage of a lift truck, that attachment assembly may also be referred to as a "hang-on assembly".

Although particular examples of attachment assemblies are shown, other examples may modify, add, omit, and/or one or more components. For example, a standard carriage without a linear actuator may be used instead of the carriage assembly shown. The frame and faceplate assemblies may be fixedly attached to the standard carriage to provide weighing capability and/or fork positioning capability (when the faceplate assembly includes a fork positioner). Additionally, or alternatively, the frame assembly and the carriage assembly may include slides, rollers, and/or other components that allow the frame assembly to move relative to the carriage assembly.

It will be appreciated that the invention is not restricted to the particular embodiment that has been described, and that variations may be made therein without departing from the scope of the invention as defined in the appended claims, as interpreted in accordance with principles of prevailing law, including the doctrine of equivalents or any other principle that enlarges the enforceable scope of a claim beyond its literal scope. Unless the context indicates otherwise, a reference in a claim to the number of instances of an element, be it a reference to one instance or more than one instance, requires at least the stated number of instances of the element but is not intended to exclude from the scope of the claim a structure or method having more instances of that element than stated. The word "comprise" or a derivative thereof, when used in a claim, is used in a nonexclusive sense that is not intended to exclude the presence of other elements or steps in a claimed structure or method.

The invention claimed is:

1. An attachment assembly, comprising:
a carriage assembly having a carriage and a linear actuator fixedly attached to the carriage, the carriage being mountable to industrial material handling equipment;
a frame assembly slidably connected to the carriage, the frame assembly having upper and lower transverse frame members and end vertical frame members connecting the upper and lower transverse frame members in a spaced relationship to define a frame central cavity therebetween, wherein the linear actuator is disposed within the frame central cavity such that the ends of the piston rods contact the end vertical frame members allowing the linear actuator to slide the frame assembly laterally relative to the carriage assembly; and
a faceplate assembly fixedly attached to the frame assembly, the faceplate assembly is configured to receive one or more support members for supporting a load, wherein the faceplate assembly includes one or more load cells configured to measure horizontal and vertical forces applied to the one or more support members and includes upper and lower transverse faceplate members and end vertical faceplate members connecting the upper and lower transverse faceplate members in a spaced relationship to define a faceplate central cavity therebetween.

2. The attachment assembly of claim 1, wherein the carriage includes an upwardly protruding portion and the frame assembly includes a downward hook portion having a groove, wherein the upwardly protruding portion is received in the groove to allow the frame assembly to slide laterally relative to the carriage assembly.

3. The attachment assembly of claim 2, wherein the upwardly protruding portion includes a cavity for receiving a portion of the industrial material handling equipment such that, when the portion of the industrial material handling equipment is received in the cavity, the upwardly protruding portion is disposed between the downward hook portion and the portion of the industrial material handling equipment.

4. The attachment assembly of claim 2, wherein the carriage includes only a transverse carriage member having the upwardly protruding portion.

5. The attachment assembly of claim 2, wherein the carriage includes upper and lower transverse carriage members and end vertical carriage members connecting the upper and lower transverse carriage members in a spaced relationship to define a carriage central cavity therebetween.

6. The attachment assembly of claim 5, wherein the upper transverse carriage member includes the upwardly protruding portion.

7. The attachment assembly of claim 6, wherein the carriage includes a tab sized to be received in a notch of the industrial material handling equipment.

8. The attachment assembly of claim 1, wherein the linear actuator includes a body fixedly attached to the carriage and longitudinally opposed piston rods slidably received in the body, each of the piston rods having an end.

9. The attachment assembly of claim 1, wherein the faceplate assembly further includes a fork positioner disposed within faceplate central cavity, the fork positioner configured to selectively move a pair of forks toward or away from each other.

10. The attachment assembly of claim 9, wherein the faceplate assembly includes a center tie bar that spans between the upper and lower transverse faceplate members across the faceplate central cavity.

11. The attachment assembly of claim 1, wherein the faceplate assembly includes at least one faceplate hole and the frame assembly includes at least one frame hole that corresponds with the at least one faceplate hole, wherein the at least one load cell of the one or more load cells is contained within at least one housing, and wherein the at least one housing is received in the at least one faceplate hole and the at least one frame hole.

12. The attachment assembly of claim 11, wherein the frame assembly includes at least one fastener to secure the at least one housing to the at least one faceplate hole and the at least one frame hole and to secure the face plate assembly to the frame assembly.

13. The attachment assembly of claim 1, wherein the one or more load cells each includes one or more first strain gauges and one or more second strain gauges that are perpendicular to the one or more first strain gauges.

14. An attachment assembly, comprising:

a carriage assembly having a carriage and a linear actuator fixedly attached to the carriage, wherein the carriage includes only a transverse carriage member having an upwardly protruding portion;

a frame assembly slidably connected to the carriage, wherein the frame assembly includes a downward hook portion having a groove, wherein the upwardly protruding portion is received in the groove to allow the frame assembly to slide laterally relative to the carriage assembly, wherein the upwardly protruding portion includes a cavity for receiving a vertically projecting portion of the industrial material handling equipment such that, when the vertically projecting portion of the industrial material handling equipment is received in the cavity, the upwardly protruding portion is disposed between the downward hook portion and the vertically projecting portion of the industrial material handling equipment; and a faceplate assembly fixedly attached to the frame assembly, the faceplate assembly is configured to receive one or more support members for supporting a load, wherein the faceplate assembly includes one or more load cells configured to measure horizontal and vertical forces applied to the one or more support members, and wherein the linear actuator slides the frame assembly laterally relative to the carriage assembly.

15. The attachment assembly of claim 14, further comprising a tab that is centrally disposed on and attached to the transverse carriage member, the tab being sized to be received in a centrally disposed notch of the vertically projecting portion of the industrial material handling equipment.

16. The attachment assembly of claim 14, wherein the upwardly protruding portion is J-shaped.

* * * * *